United States Patent [19]

Meyerand, Jr. et al.

[11] 4,107,010
[45] Aug. 15, 1978

[54] PHOTO-ELECTROLYTIC PRODUCTION OF HYDROGEN

[75] Inventors: Russell Gilbert Meyerand, Jr., Glastonbury; Nicholas Leo Krascella, Manchester; David Gue McMahon, West Hartford, all of Conn.

[73] Assignee: United Technologies Corporation, Hartford, Conn.

[21] Appl. No.: 843,992

[22] Filed: Oct. 20, 1977

Related U.S. Application Data

[62] Division of Ser. No. 725,302, Sep. 21, 1976, Pat. No. 4,069,120.

[51] Int. Cl.² .............................................. C25B 1/02
[52] U.S. Cl. ................................. 204/129; 204/128; 204/157.1 R; 204/158 HE; 123/DIG. 12; 429/19
[58] Field of Search .............. 204/157.1 R, 157.1 HE, 204/129, 128; 123/DIG. 12, 3; 429/19

[56] References Cited
U.S. PATENT DOCUMENTS

| 3,839,169 | 10/1974 | Moyer ........................ 204/157.1 R |
| 3,925,212 | 12/1975 | Tchernev ..................... 204/157.1 R |

Primary Examiner—R. L. Andrews
Attorney, Agent, or Firm—Richard N. James

[57] ABSTRACT

Hydrogen and oxygen are produced from water in a process involving the photodissociation of molecular bromine with radiant energy at wavelengths within the visible light region and a subsequent electrolytic dissociation of hydrogen halides.

2 Claims, 3 Drawing Figures

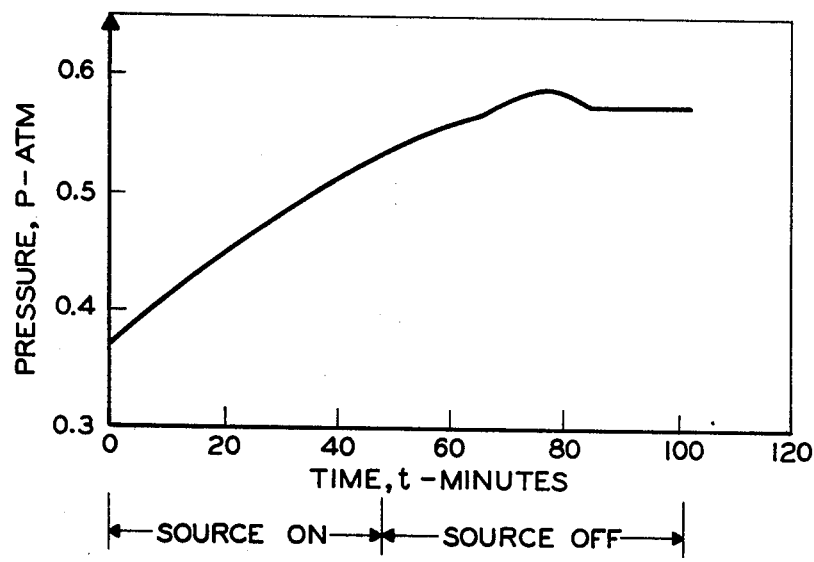
FIG. 2 PRESSURE AS A FUNCTION OF TIME
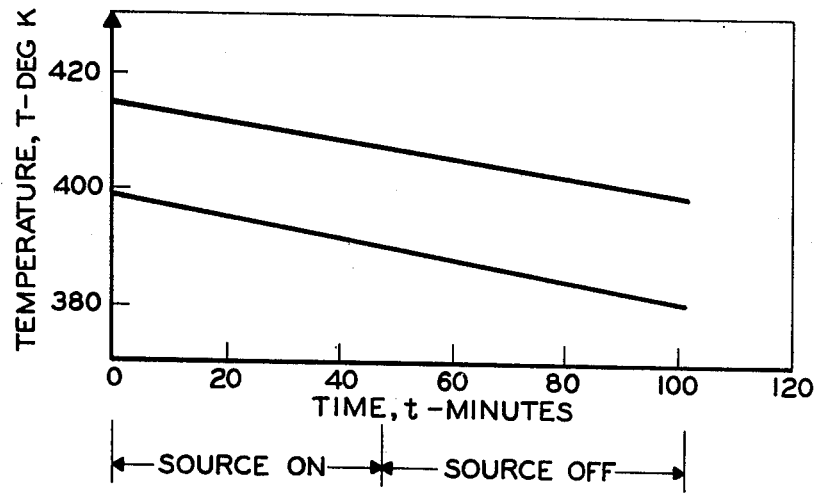
FIG. 3 TEMPERATURE AS A FUNCTION OF TIME

PHOTO-ELECTROLYTIC PRODUCTION OF HYDROGEN

RELATED APPLICATIONS

This is a division of application Ser. No. 725,302, filed Sept. 21, 1976, now U.S. Pat. No. 4,069,120.

Reference is made to an application of the same assignee of even filing date herewith entitled "Photolytic Production of Hydrogen" wherein the basic photolytic processes are also discussed.

BACKGROUND OF THE INVENTION

The present invention relates in general to photoelectrolytic processes and is directed, more specifically, to the production of hydrogen and/or oxygen from water utilizing a photo-electrolytic process.

The concept of employing hydrogen as a fuel is attractive because it is abundant and nonpolluting. Unfortunately, although it is abundant it is not readily available in the molecular state and, in order for it to become a viable fuel satisfying significant future energy requirements, means for producing it in vast quantities in an economic manner will have to be identified and demonstrated.

Past technologies for the production of hydrogen, including the electrolysis of water or processing of fossil fuels, have typically required the expenditure of large amounts of energy usually from sources fueled by expendable materials.

In recent years some attention has been given to the production of hydrogen in closed-cycle, multistep, thermochemical processes for cracking water. However, the direct thermal decomposition of water requires temperatures in excess of 2500° K. Furthermore, separation of the products, hydrogen and oxygen, is extremely difficult.

The direct photodecomposition of water requires radiation in the ultraviolet spectral region at wavelengths well below 2000 A. However, suitable intense ultraviolet light sources are not readily available nor are the materials which are readily transparent to such ultraviolet radiation.

What is really required is a practical means of producing hydrogen in a process that does not involve the unrealistic expenditure of our natural nonregenerable resources.

SUMMARY OF THE INVENTION

The present invention involves a process for the production of hydrogen from water utilizing radiant energy within the visible light spectrum in a series of low-temperature photolytic or thermal and electrolytic reactions.

The overall reaction utilizes halogens, and an overall reaction describing one embodiment of the process may be expressed as:

$$Br_2 + H_2O \rightleftharpoons H_2 + Br_2 + \tfrac{1}{2}O_2$$

or $$Br_2 + I_2 + H_2O \rightleftharpoons H_2 + Br_2 + I_2 + \tfrac{1}{2}O_2$$

Individually, the preferred reactions are depicted as follows:

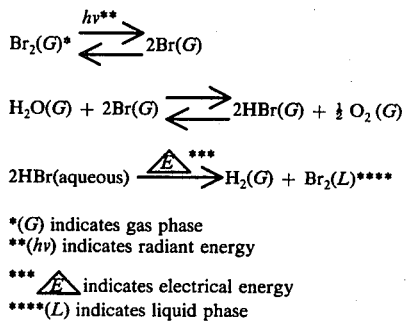

*(G) indicates gas phase
**(hv) indicates radiant energy
*** 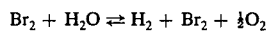 indicates electrical energy
****(L) indicates liquid phase or

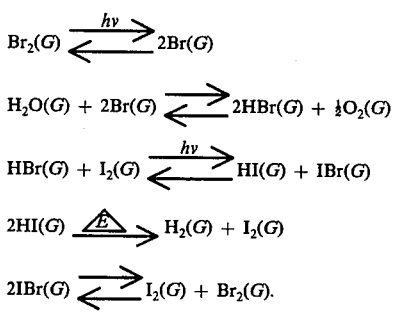

The hydrogen and oxygen thus produced could be reacted in a fuel cell to provide power during peak demand periods.

There are many advantages to the invention and significant differences from the past technology including the following:
1. a source of high temperature heat is not required,
2. visible light is effective in promoting desired photolytic reactions such light being available from many sources including the sun,
3. optics or other concentrators are not required,
4. a large percentage of the total solar flux can be used to effect the reactions, and the products are easily separated.

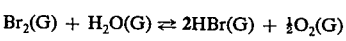

Figure 1:
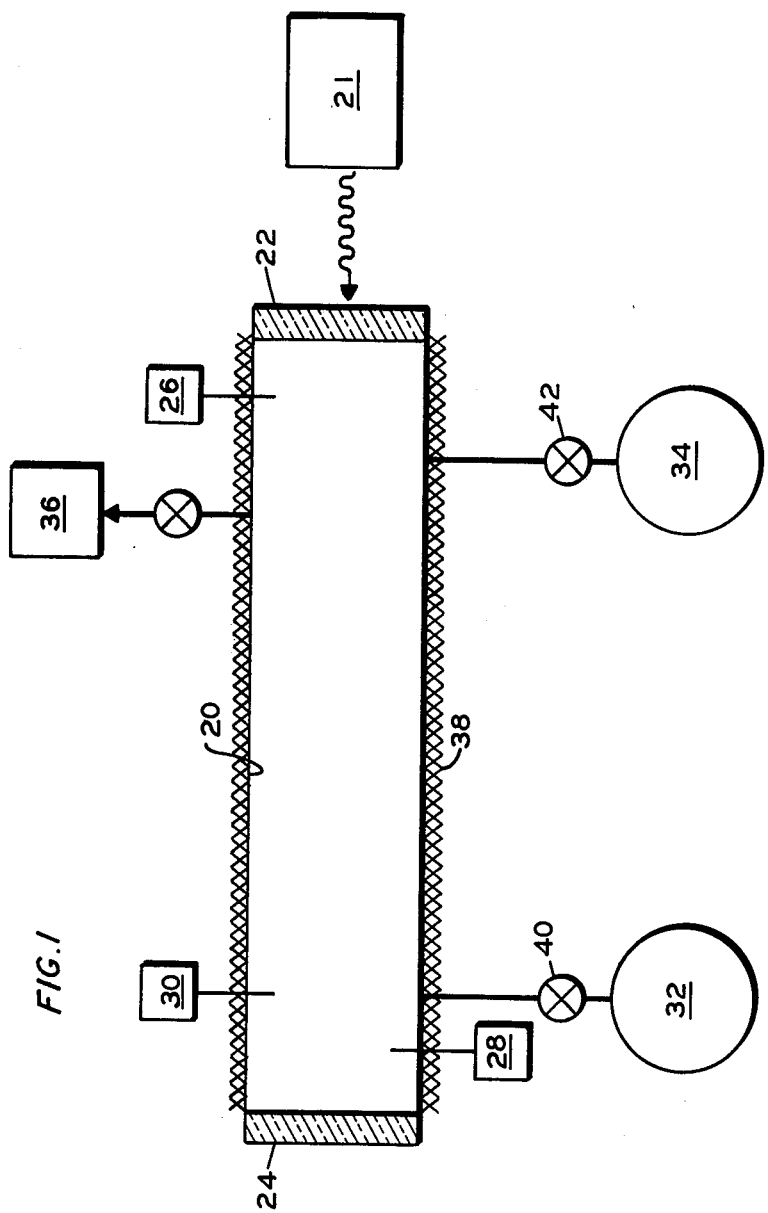
FIG. 1 is a schematic of the apparatus used to verify the ability of visible light to produce the reaction.

FIG. 2 is a graph of pressure versus time in the above reaction.

FIG. 3 is a graph of temperature versus time in the above reaction using the apparatus of FIG. 1, as hereinafter described.

DESCRIPTION OF THE PREFERRED EMBODIMENTS

Closed cycle processes are extremely attractive and such a process is herein described as a preferred embodiment. In the process intermediate species are regenerated without loss and the only pollutant is degraded heat.

In the first embodiment, hydrogen bromide is provided according to the reaction:

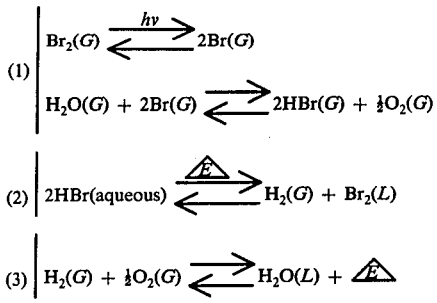

In reaction (1), gaseous molecular bromine and water are allowed to react at approximately 373° K in the presence of radiation (3650–5350 A) to yield gaseous hydrogen bromide (HBr) and oxygen ($O_2$).

Hydrogen bromide is separated by dissolution in a $HBr/H_2O$ mixture up to a concentration of about 87% HBr/13% $H_2O$ (by weight). Since oxygen is relatively insoluble in water, the hydrogen bromide/oxygen separation is effected.

Hydrogen bromide is not readily dissociated at temperatures below approximately 1500° K and forms a constant boiling mixture with water at about 47% HBr which boils at 399° K. Distillation of the $HBr/H_2O$ mixture drives off HBr which is collected until the concentration of HBr in water reaches 47%.

In reaction (2) the hydrogen bromide is electrolytically decomposed during a period of off-peak power and the hydrogen together with the oxygen already available can be recombined as in a fuel cell (reaction 3) providing electricity in a peak power demand period. The advantage here over the direct electrolysis of water is that the hydrogen bromide can be electrolyzed with less energy expenditure. Furthermore, the recombination of the hydrogen and oxygen in a fuel cell can theoretically produce more electrical energy than that required for the hydrogen bromide electrolysis.

In a variation of the foregoing, the following reactions are utilized:

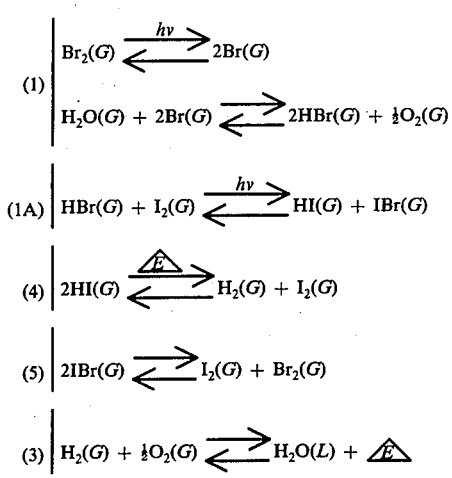

In this variation, it will be seen that hydrogen bromide is photolytically produced as in the first embodiment. However, instead of electrolyzing the hydrogen bromide the collected HBr is allowed to react with iodine ($I_2$) (Reaction 1A) at 456° K in the presence of radiation (4300A–7400A) to yield gaseous hydrogen iodide (HI) and iodine monobromide (IBr), some unreacted HBr remaining.

Cooling the reaction mixture below the boiling point of the iodine monobromide permits the separation of the liquid IBr from the gaseous hydrogen iodide.

Iodine and bromine may be regenerated from the iodine monobromide by decomposition of the monobromide at a temperature of about 700° K or photolytically in the visible spectral region (Reaction 5).

The hydrogen iodide resultant from the reaction 1A operation is electrolytically decomposed yielding hydrogen and iodine (Reaction 4).

Recombination of the hydrogen and oxygen with the production of electrical power may then be affected, as previously discussed.

In the case of solar energy as the radiation source:
1. about 21 percent of the total solar flux is usable to effect reaction (1);
2. about 30 percent of the total solar flux is available to effect reaction (1A); and
3. about 30 percent of the total solar flux can be used for reaction (5).

The reaction sequence is not Carnot limited in the sense that photolytic dissociation does not depend on temperature as is the case with reactions associated with a Carnot cycle. Furthermore, the reactions depend only upon the photon flux photons/$cm_2$/sec.) thus, apparatus to effect a concentration of radiation is not required.

Solar energy is one readily available radiation source. Another radiation source capable of providing radiation of the desired wavelength is the plasma core reactor. A typical plasma core reactor radiates about $3 \times 10^2$ watt/$cm^2$ (effective black body radiating temperature of 4000° K.) at wavelengths between 3300A and 5300A. For radiating temperatures of 4000° K and 6000° K, approximately 25 percent and 45 percent, respectively, of that spectral flux is available for use in the bromine and iodine photodissociation reactions.

Verification of the reaction,

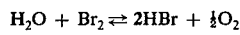

was made utilizing the apparatus set forth in FIG. 1.

This apparatus was a 6.4 cm diameter by 30 cm. long reaction cell (20) having Pyrex (22 and 24) windows fused to both ends.

A tungsten-iodine filament lamp (21) was utilized as the source of radiation.

Pressure and temperature traces for the 100-minute time period of the experiment are shown in FIGS. 2 and 3 respectively, as functions of time. During the period of irradiation (about 48 minutes), a pressure increase was noted; the cell pressure increased from 0.36 atm to about 0.52 atm (FIG. 2). The cell pressure was also observed to increase slightly over the next 30-minute period after the radiation source had been extinguished. The pressure during this period increased from about 0.52 atm to approximately 0.56 atm and remained effectively constant thereafter until conclusion of the experiment (about 100 minutes).

Temperature traces for the two thermocouples 26 and 28 as a function of time for the corresponding time span of the experiment are illustrated in FIG. 3.

The data of FIG. 3 indicate an average decrease in cell temperature over the time span of the experiment. The straight line curves in FIG. 3 are least squares determinations of the temperature data for the two thermocouples.

The increasing cell pressure with a corresponding decrease in temperature indicates that a reaction between water and bromine had occurred with an attendant increase in pressure.

Temperature and pressure monitoring were accomplished by means of the chromel-alumel thermocouples and an absolute pressure transducer (30).

Two 100 ml flasks 32 and 34 were installed on the cell and served as reservoirs for liquid water and bromine as shown in FIG. 1. In addition a vacuum pump 36 was installed to permit evacuation of the cell as required. The cell and various components were heated with variac-controlled, electrical tapes 38.

The entire apparatus was placed in a hood because of the corrosiveness of bromine.

Equi-molar quantities of liquid water and bromine were measured with hypodermic syringes and introduced into the 100 ml reservoirs. The quantities were such that total evaporation of both the water and bromine would yield a cell pressure of about 0.5 atm prior to reaction. The liquids in the reservoirs were sealed off from the reaction cell by means of stopcocks 40 and 42. Subsequently, the liquids (water and bromine) were frozen out with liquid nitrogen and the entire system (reaction cell and reservoirs) evacuated with the vacuum pump. After evacuation of the system, the system was isolated from the pump and the water and bromine were allowed to thaw. Finally, the cell and reservoirs were heated to about 400° K. At 400° K, the cell pressure attained a value of about 0.36 atm prior to irradiation. Failure to attain a predetermined pressure of 0.5 atm was due largely to inability to accurately measure the volume of liquid bromine introduced into the system initially.

After attainment of equilibrium with respect to temperature and pressure, irradiation of the reaction mixture was initiated with concurrent monitoring of cell pressure and temperature. The reaction mixture was irradiated for about 48 minutes. Pressure and temperature were monitored for a total of approximately 100 minutes.

Table I illustrates the characteristics of various species discussed herein.

TABLE I

| Species | Dissociation Energy ev | | Melting Point °K(°C) | Boiling Point °K(°C) | Solubility g/100 g $H_2O$ |
|---|---|---|---|---|---|
| | ev | nm | | | |
| $I_2$ | 1.542 | 804 | 387(114) | 456(183) | 0.034 |
| $Br_2$ | 1.971 | 629 | 265.7(−7.3) | 331.8(58.8) | 15.5 |
| $Cl_2$ | 2.475 | 501 | 171(−102) | 239.3(−33.7) | 0.64 |
| HI | 3.056 | 406 | 222.2(−50.8) | 237.6(−35.4) | ~2.5 |
| HBr | 3.754 | 330 | 184.5(−88.5) | 206(−67) | 194 |
| HCl | 4.430 | 280 | 161(−112) | 189.3(−83.7) | 69.8 |
| $H_2$ | 4.553 | 272 | 18.8(−254.2) | 20.2(−252.8) | negl. |
| $O_2$ | 5.080 | 244 | 54.6(−218.4) | 90 (−183.0) | negl. |
| $H_2O$ | 5.12 | 242 | 273(0) | 373(100) | — |

Although the invention has been shown and described with respect to preferred embodiments thereof, it should be understood by those skilled in the art that the foregoing and various other changes and omissions in the form and detail thereof may be made therein without departing from the spirit and scope of the invention.

Having thus described typical embodiments of my invention, that which I claim as new and desire to secure by Letters Patent of the United States is:

1. A process of producing electrical power which comprises:
   forming a water/halogen gas mixture;
   irradiating the mixture with radiation energy in the visible spectrum to form the corresponding hydrogen halide and oxygen;
   separating the hydrogen halide from the oxygen;
   electrolytically decomposing the hydrogen halide to produce hydrogen; and
   combining the hydrogen and oxygen to produce electrical power.

2. The process according to claim 1 wherein the halogen is bromine.

* * * * *